Figures 1, 2:
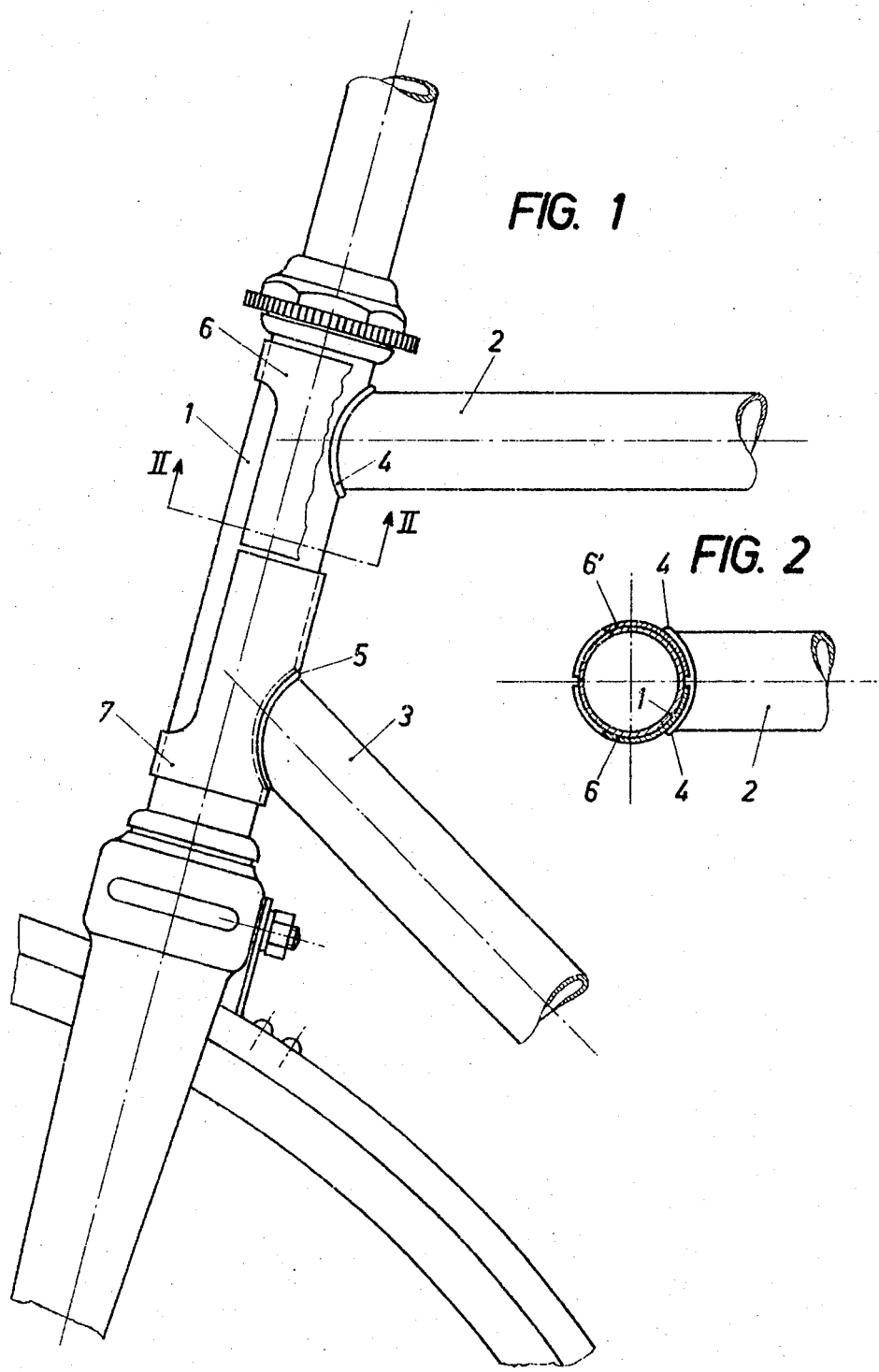

United States Patent [19]
Weiss

[11] 3,860,265
[45] Jan. 14, 1975

[54] BICYCLE FRAME

[76] Inventor: Franz Weiss, Sportplatzstrasse 7a, A-8580 Koflach, Austria

[22] Filed: Aug. 27, 1973

[21] Appl. No.: 392,084

[30] Foreign Application Priority Data
Dec. 11, 1972 Austria .............................. 10509/72

[52] U.S. Cl. ................ 280/281, 280/153.5, 138/99, 138/147
[51] Int. Cl. ........................... B62k 3/02, F16l 55/16
[58] Field of Search ............ 280/281, 153.5, 287, 1; 138/96 R, 99, 145, 146, 147

[56] References Cited
UNITED STATES PATENTS

| | | | |
|---|---|---|---|
| 637,386 | 11/1899 | Halifax ......................... | 280/281 UX |
| 2,491,379 | 12/1949 | Kraeft et al. ................. | 280/281 UX |
| 3,030,124 | 4/1962 | Holloway ............................ | 280/281 |
| 3,770,556 | 11/1973 | Evans et al. ...................... | 138/99 X |

FOREIGN PATENTS OR APPLICATIONS

| | | | |
|---|---|---|---|
| 1,025,469 | 1/1953 | France ............................... | 280/281 |
| 663,120 | 3/1929 | France ............................... | 280/281 |
| 856,190 | 12/1960 | Great Britain ..................... | 138/147 |

Primary Examiner—Robert S. Ward, Jr.
Attorney, Agent, or Firm—Kurt Kelman

[57] ABSTRACT

The metal tube elements of a bicycle frame are welded or brazed together and a protective sleeve is mounted on one of the joined tube elements in the region of each welding seam and covers the seam.

2 Claims, 2 Drawing Figures

BICYCLE FRAME

The present invention relates to bicycle frames comprising a plurality of metal tube elements interconnected to from the frame.

It has been proposed to join respective ones of the tube elements together with sleeve joints or, for reasons of economy, to replace these sleeve joints by welding or brazing seams to form the frame. Throughout the specification and claims, the term "welding" includes hard-soldering or brazing.

While welding or brazing is more economical, it has the disadvantage of forming seams at the joints. Lacquers conventionally coating bicycle frames are not bonded firmly to such seams and tend to peel off after a certain time.

It is accordingly the primary object of this invention to overcome this disadvantage in bicycle frames whose tube elements are joined together by welding seams.

This and other objects are accomplished in accordance with the invention with a protective element mounted on one of the joined tube elements in the region of each welding seam and at least partially covering the seam.

The protective element may be a suitable synthetic resin sheet material, metal sheeting or any other suitable sheeting. It may carry a chromium or lacquer coating. It is advantageously adhesively bonded to the one tube element but may also be affixed thereto by screws, rivets or the like.

The above and other objects, advantages and features of the present invention will become apparent from the following detailed description of a now preferred embodiment thereof, taken in conjunction with the accompanying drawing wherein FIG. 1 is a partial side elevational view of the front part of a bicycle frame showing three frame tubes in the region of their joints; and FIG. 2 is a section along lines II—II of FIG. 1.

Referring now to the drawing, the frame tubes 2 and 3 are shown joined to front pillar frame tube 1 by respective welding seams 4 and 5 in a conventional manner. According to the invention, each welding seam is at least partially covered by a respective protective element 6 and 7 mounted on the frame tube 1. In the preferred embodiment illustrated in FIG. 2, the protective element consists of two parts at least partially encompassing frame tube 1 and forming a sleeve thereabout in the region of the welding seam. As shown in FIG. 2, sleeve parts 6 and 6' may be separately and simply mounted on the tube by adhesively bonding them thereto, the two sleeve parts defining a cut-out receiving the tube 2, the cut-out fitting the tube 2 so that the protective sleeve 6, 6' covers the seam 4.

I claim:

1. A bicycle frame comprising a plurality of metal tube elements interconnected to form the frame, welding seams joining respective ones of the tube elements together, and a protective element mounted on one of the joined tube elements in the region of each welding seam and at least partially covering the seam, the protective element consisting of two parts at least partially encompassing the one tube element and forming a sleeve thereabout in the region of the welding seam, and the sleeve parts defining a cutout receiving the other tube element joined to the one tube element.

2. The bicycle frame of claim 1, wherein the sleeve parts are bonded adhesively to the one tube element.